United States Patent [19]

Boyle et al.

[11] Patent Number: 4,675,153
[45] Date of Patent: Jun. 23, 1987

[54] ZIRCONIUM ALLOY FUEL CLADDING RESISTANT TO PCI CRACK PROPAGATION

[75] Inventors: Raymond F. Boyle, San Mateo, Calif.; John P. Foster, Monroeville, Pa.

[73] Assignee: Westinghouse Electric Corp., Pittsburgh, Pa.

[21] Appl. No.: 589,390

[22] Filed: Mar. 14, 1984

[51] Int. Cl.$^4$ ............................................. G21C 3/00
[52] U.S. Cl. .................................. 376/416; 376/414; 376/417; 427/6; 427/239
[58] Field of Search ...................... 376/416, 414, 417; 427/6, 239, 405; 106/1.16; 148/6.2, 6.35, 6

[56] References Cited

U.S. PATENT DOCUMENTS

| | | | |
|---|---|---|---|
| 2,772,964 | 12/1956 | Thomas et al. | 75/177 |
| 3,097,094 | 7/1963 | Rubenstein et al. | 75/177 |
| 3,148,055 | 9/1964 | Kass et al. | 75/177 |
| 3,925,151 | 12/1975 | Klepfer | 176/68 |
| 4,029,545 | 6/1977 | Gordon | 376/417 |
| 4,045,288 | 8/1977 | Armijo | 176/82 |
| 4,200,492 | 4/1980 | Armijo | 376/417 |
| 4,284,660 | 8/1981 | Donaghy | 376/417 |
| 4,372,817 | 2/1983 | Armijo et al. | 376/417 |
| 4,390,497 | 6/1983 | Rosenbaum et al. | 376/414 |
| 4,411,861 | 10/1983 | Steinberg | 376/417 |
| 4,473,410 | 9/1984 | Grubb | 376/417 |

OTHER PUBLICATIONS

Kass, "The Development of the Zircaloys", ASTM STP No. 368 (1964), pp. 3–27.
ASTM B350-80, "Standard Specification for Zirconium and Zirconium Alloy Ingots for Nuclear Application", published Nov., 1980.
Chubb et al., "Creep of Zirconium-Tin Alloys", BMI-832, dated May 27, 1953.
Bibb et al., "Investigations of Binary Zirconium Alloys", KAPL-2162 dated Nov., 1960.
Cheadle et al., "Plastic Instability in Irradiated Zr-Sn and Zr-Nb Alloys", Zirconium in Nuclear Applications, ASTM STP 551 (1974), pp. 370–384.
Veevers et al., "Effect of Irradiation on Strain Aging in Annealed Zircaloy-2", Journal of Nuclear Materials 27 (1968), pp. 108–111.
Veevers et al., "The Effect of Neutron Irradiation and Cold Work on the Strain-Aging Behavior of Zircaloy-2", Applications Related Phenomena for Zirconium and its Alloys, ASTM STP 458, American Society for Testing and Material, 1969, pp. 194–209.
Kelley et al., "Strain Aging in Zirconium-Oxygen Alloys", Journal of Nuclear Materials 45 (1973), pp. 23–24.
Fidleris, "The Effect of Texture and Strain Aging on Creep in Zircaloy-2", Applications Related Phenomena for Zirconium and its Alloys, ASTM STP 458, American Society for Testing and Material, 1969, pp. 1–17.

Primary Examiner—Donald P. Walsh
Attorney, Agent, or Firm—John J. Prizzi; Donald M. Satina

[57] ABSTRACT

Described herein is a composite nuclear fuel rod cladding tube which includes two concentric layers of zirconium base alloys metallurgically bonded to each other. The outer layer is composed of a conventional zirconium base alloy having high strength and excellent aqueous corrosion resistance. The inner layer is composed of a second zirconium base alloy containing about 0.2 to 0.6 wt. % tin, about 0.03 to 0.11 wt. % iron and up to about 350 ppm oxygen. This second alloy while also having excellent aqueous corrosion resistance, is further characterized by the ability to prevent the propagation of cracks initiated during reactor operation due to pellet-cladding interaction.

16 Claims, 3 Drawing Figures

ZIRCONIUM ALLOY FUEL CLADDING RESISTANT TO PCI CRACK PROPAGATION

BACKGROUND OF THE INVENTION

The present invention pertains to the fields of zirconium base alloys and their use in water reactor fuel rod cladding. It is especially concerned with zirconium base alloys having properties which minimize the adverse effects of pellet-clad interaction (PCI) in water reactor fuel elements.

The use of cladding tubes made entirely of a high zirconium alloy has been the practice in the water reactor industry. Examples of common alloys used are Zircaloy-2, Zircaloy-4 and zirconium-2.5 w/o niobium. These alloys were selected based on their nuclear properties, mechanical properties and high-temperature aqueouscorrosion resistance.

The history of the development of Zircaloy-2 and 4, and the abandonment of Zircaloy-1 and 3 is summarized in: Stanley Kass, "The Development of the Zircaloys," published in ASTM Special Technical Publication No. 368 (1964) pp. 3–27. This article is hereby incorporated by reference. Also of interest with respect to Zircaloy development are U.S. Pat. Nos. 2,772,964; 3,097,094; and 3,148,055.

Most commercial chemistry specifications for Zircaloy-2 and 4 conform essentially with the requirements published in ASTM B350-80, (for alloy UNS No. R60802 and R60804, respectively) for example. In addition to these requirements the oxygen content for these alloys is required to be between 900 to 1600 ppm but typically is about 1200±200 ppm.

It has been a common practice to manufacture Zircaloy cladding tubes by a fabrication process involving: hot working an ingot to an intermediate size billet or log; beta solution treating the billet; machining a hollow billet; high temperature alpha extruding the hollow billet to a hollow cylindrical extrusion; and then reducing the extrusion to substantially final size cladding through a number of cold pilger reduction passes, having an alpha recrystallization anneal prior to each pass. The cold worked, substantially final size cladding is then final annealed. This final anneal may be a stress relief anneal, partial recrystallization anneal or full recrystallization anneal. The type of final anneal provided, is selected based on the designer's specification for the mechanical properties of the fuel cladding.

One problem that has occurred in the use of fuel rods utilizing the aforementioned cladding has been the observation of cracks emanating from the interior surface of the cladding which is placed under additional stress by contact with a fractured, thermally expanding oxide fuel pellet. These cracks sometimes propagate through the wall thickness of the cladding destroying the integrity of the fuel rod and thereby allowing coolant into the rod and radioactive fission products to contaminate primary coolant circulating through the reactor core. This cracking phenomena, is generally believed to be caused by the interaction of irradiation hardening, mechanical stress and fission products, producing an environment conducive to crack initiation and propagation in zirconium alloys.

Zircaloy fuel cladding tubes having a zirconium layer bonded to their inside surface have been proposed as being resistant to the propagation of cracks initiated at the interface between the fuel pellet and cladding during water reactor operation. Examples of these proposals are provided by U.S. Pat. No.s 4,372,817; 4,200,492; and 4,390,497.

The zirconium liners of the foregoing patents have been selected because of their resistance to PCI crack propagation without consideration of this resistance to aqueous corrosion. If the cladding should breach in the reactor, allowing coolant inside the cladding, it is expected that the aqueous corrosion resistance of the liner will be vastly inferior to that of the high zirconium alloy making up the bulk of the cladding. Under these conditions the liner would be expected to completely oxidize thereby becoming useless, relatively rapidly, while leading to increased hydride formation in the zirconium alloy portion of the cladding, thereby compromising the structural integrity of the zirconium alloy. This degradation of the cladding could lead to gross failure with significantly higher release of uranium and radioactive species to the coolant.

The present inventors have proposed the following alloy barrier fuel cladding design which addresses this failing of the aforementioned designs.

It is submitted that the following zirconium base alloys will be particularly effective as a barrier to the propagation of PCI related cracks when they are metallurgically bonded in a thin fully recrystallized layer of at least about 0.003 inches in thickness to the inside surface of water reactor fuel cladding tubes composed of conventional reactor grade zirconium base alloys. These PCI resistant alloys in accordance with the present invention contain:

About 0.2 to 0.6 weight percent tin;
About 0.03 to 0.11 weight percent iron;
The balance of the alloy consists essentially of zirconium except for incidental impurities, including oxygen which is limited to less than about 350 ppm.

Within the above composition range it is preferred that the tin content be held to about 0.4 to 0.6 wt.%.

It is also preferred that the iron content of the present invention be between about 0.03 to 0.06 wt.%.

It is also preferred that the total content of incidental impurities be limited to less than about 1500 ppm.

In addition, it is preferred that the oxygen be limited to less than about 250 ppm.

The preceding and other aspects of the present invention will become more apparent upon review of the drawings in conjunction with the detailed description of the invention which follows below.

DETAILED DESCRIPTION OF THE INVENTION

Figure 1:
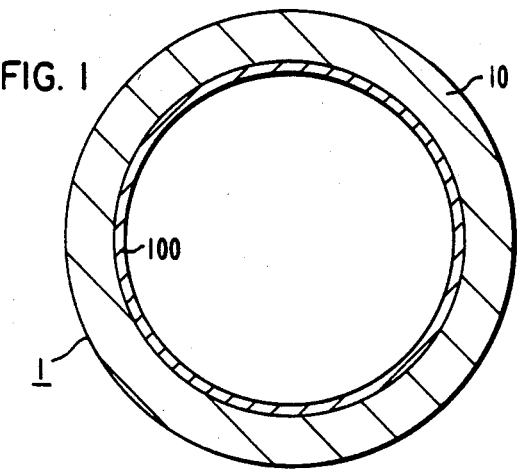
FIG. 1 shows a transverse cross section through a cladding tube according to the present invention.

A transverse section through a cladding tube 1 in accordance with the present invention is shown in FIG. 1. The cladding tube is composed of an outer layer, or tubular member, 10 bonded to an inner layer, or tubular member, 100. The outer layer 10 is composed of a first zirconium alloy having excellent resistance to in-reactor aqueous corrosion, high strength, and a low creep rate.

This first zirconium alloy is preferably a Zircaloy-2 alloy, a Zircaloy-4 alloy or a zirconium, about 1 to 3 wt.% niobium alloy, such as zirconium-2.5 w/o niobium. The inner layer is composed of a second zirconium base alloy. This second alloy has been designed by the present inventors to have a combination of in-pile resistance to crack propagation caused by pellet cladding interaction effects, as well as enhanced resistance to aqueous corrosion compared to zirconium. Preferably, the inner layer has a wall thickness between about 0.003 and 0.0045 inches.

The present inventors now submit that by limiting the tin content to about 0.2 to 0.6 weight percent, and the oxygen content to less than about 350 ppm and more preferably less than 250 ppm, that the creep rate and stress relaxation rates of these alloys should be high enough to provide significantly enhanced and effective resistance to PCI crack propagation compared to the commercial zirconium alloy making up the outer portion of the cladding according to the present invention. It is further believed that when the tin content is held to about 0.4 to 0.6 weight percent in the present invention, an optimum combination of low neutron irradiation hardening, and aqueous corrosion resistance will be obtained. In addition, the tin content would be expected to reduce the recrystallized grain size of the liner, compared to a zirconium liner. In the range of less than about 350 ppm oxygen, and 0.03 to 0.06 weight percent iron, the irradiation ductility of our alloy under BWR operating conditions should be comparable to, or better than, that of zirconium containing less than about 350 ppm oxygen, resulting in a barrier having the crack propagation resistance of zirconium, but with essentially the same aqueous corrosion resistance as commercial Zircaloy-2 or Zircaloy-4. It is preferred that all other incidental impurities listed in Table 1 of ASTM B350-80 meet the requirements shown there for grade R60001 which are as follows, maximum impurities, in wt.%:

| | |
|---|---|
| Al | 0.0075 |
| B | 0.00005 |
| Cd | 0.00005 |
| C | 0.0270 |
| Cr (when not an alloying element) | 0.020 |
| Co | 0.0020 |
| Cu | 0.0050 |
| Hf | 0.010 |
| H | 0.0025 |
| Mg | 0.0020 |
| Mn | 0.0050 |
| Mo | 0.0050 |
| Ni | 0.0070 |
| N | 0.0065 |
| Si | 0.0120 |
| Ti | 0.0050 |
| W | 0.010 |
| U | 0.00035 |

The total amount of incidental impurities (including oxygen) is preferably held to less than about 1500 ppm and most preferably less than about 1000 ppm to minimize the cumulativse adverse effect incidental impurities can have on irradiation hardening. Table 1 of ASTM B350-80 is hereby incorporated by reference.

The invention will be further clarified by the following examples which are intended to be purely exemplary of the present invention.

Three alloys having the nominal compositions shown in Table II are melted by arc melting the required alloying additions with commercially available zirconium. Chemical analysis of the Alloy A and B ingots for tin, iron and oxygen (see Table III) show that the ingot chemistry is in good agreement with the aiming points shown in Table II.

It should be understood that the cladding chemistry requirements set forth in this application may be met by performing chemical analyses at the ingot stage of manufacture for alloying elements and impurities, and subsequently, at an intermediate stage of manufacture, such as near the co-extrustion stage, for the interstitial elements, oxygen, hydrogen and nitrogen. Chemical analysis of the final size cladding is not required.

TABLE II

| | Nominal Composition of Inner Layer Material | | |
|---|---|---|---|
| | Alloy A | Alloy B | Alloy C |
| Sn | 0.5 w/o | 0.5 w/o | 0.5 w/o |
| Fe | 0.08 w/o | 0.04 w/o | 0.04 w/o |
| O | ~70 ppm | ~70 ppm | ~300 ppm |
| Zr | remainder, with incidental impurities | remainder, with incidental impurities | remainder, with incidental impurities |

TABLE III

| | Ingot Chemical Analyses | |
|---|---|---|
| | Alloy A | Alloy B |
| Sn | 0.46 w/o | 0.52–0.53 w/o |
| Fe | 0.077 w/o | 0.035 w/o |
| O | 75 ppm | 75 ppm |

The ingots formed are then fabricated by conventional Zircaloy primary fabrication techniques, including a beta solution treatment step, into tubular starting components for the inner layer. Tubular Zircaloy starting components for the outer layer are conventionally fabricated from ingots meeting the requirements of ASTM B350-80 for grade R60802 or R60804 and having an oxygen content between about 900 and 1600 ppm. These tubular starting components, for both the inner and outer layers, may have a cold worked, hot worked, alpha annealed, or beta quenched microstructure.

The inside diameter surface of the outer layer starting component, as well as the outside diameter surface of the inner layer starting component are then machined to size, such that the clearance between the components when nested inside of each other is minimized. After machining, the components are cleaned to remove, as nearly as possible, all surface contamination from the surfaces to be bonded. After cleaning, the component surfaces to be bonded are preferably maintained under clean room conditions until they are welded together. Recontamination of the surfaces to be bonded is thereby minimized. The components are then nested inside of each other, and the annulus formed at the interface of the adjacent components is vacuum electron beam welded shut, such that a vacuum is maintained in the annulus after welding both ends of the nested components.

At this stage, the unbonded tube shell assembly is ready to be processed according to the known extrusion, cold pilgering and annealing processes utilized to fabricate cladding tubes made completely of Zircaloy. Conventional Zircaloy lubricants, cleaning, straightening, and surface finishing techniques may be used in conjunction with any of the processes, both conventional and new, described in copending application Ser.

Nos. 343,788 and 343,787 both filed on Jan. 29, 1982 (now continuation application Ser. Nos. 571,123 and 571,122, respectively, both filed on Jan. 13, 1984), which are hereby incorporated by reference. All of the foregoing fabrication processes will result in complete and continuous autogeneous metallurgical bonding of the layers, except for minor, insignificant areas of unavoidable bond-line contamination.

Surface beta treatment, either by laser or induction heating, as described in U.S. patent application 343,788 while not required to practice the present invention is clearly preferred. When used, such treatment would be performed either between the next to last and last cold pilgering passes or just prior to the next to last cold pilger pass. In either case it is preferred that the tube have had an intermediate anneal as well as being straightened, if necessary, prior to surface beta treatment. After surface beta treatment all intermediate, as well as the final anneals, should be performed below 600° C. and more preferably below 550° C. Most preferably, the final anneal is performed below about 500° C. These low temperature anneals are used to preserve the enhanced corrosion resistance imparted by the beta surface treatment.

While the surface beta treatment produces a Widmanstatten microstructure in only about the outer 10 to 40% of the wall thickness of the as beta surface treated intermediate size tube, it is to be understood that enhanced aqueous corrosion resistance produced by such treatment is not confined to that area but preferably extends throughout the outer layer, as well as the inner layer and is retained after cold pilgering and annealing. Most preferably, the aqueous corrosion resistance of the outer layer and inner layer are characterized by a substantially black, adherent corrosion film and a weight gain of less than about 200 mg/dm$^2$, and more preferably less than about 100 mg/dm$^2$ after a 24-hour, 500° C., 1500 psi steam test.

Whether or not surface beta treatment has been used, the final anneal, after the final cold pilgering pass, is one in which the zirconium alloy inner layer is at least substantially fully recrystallized, to an average grain size which is no larger than about 1/10, and more preferably between about 1/10 and 1/20, the inner layer wall thickness and the Zircaloy outer layer has been at least fully stress relief annealed. After the final anneal, conventional Zircaloy tube cleaning, straightening, and finishing steps are performed.

Figure 3:
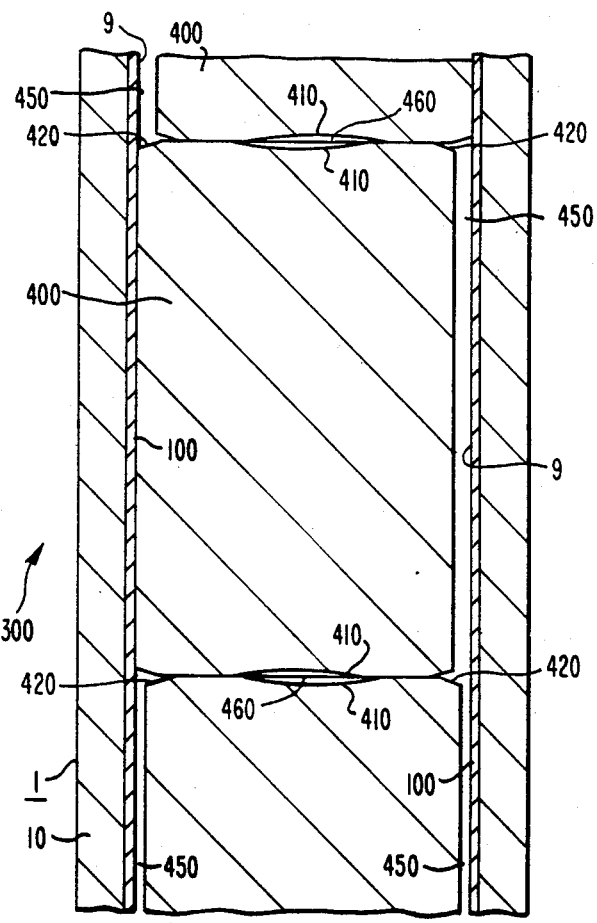
FIG. 3 shows an enlarged cross-sectional view of an enriched portion of the fuel element shown in FIG. 2 exposing a diametral longitudinal plane of the cladding.
Figure 2:
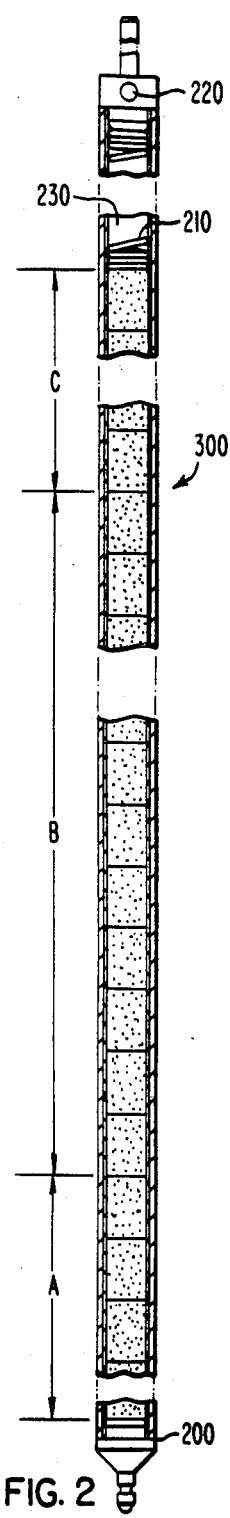
FIG. 2 shows a schematic presentation of a partial cross section through a water reactor fuel element in accordance with the present invention.

As finished, the lined cladding is ready for loading with fissile fuel material. A preferred embodiment of a hermetically sealed boiling water reactor fuel rod is shown in FIGS. 2 and 3. As shown in FIG. 3, the fuel rod 300 utilizes the cladding 1 according to the present invention. This cladding has an outer layer 10 preferably of Zircaloy 2 or 4 metallurgically bonded to an inner layer 100 about 0.003 inches thick and composed of, for example, either alloy A, B, or C as previously described. The overall wall thickness of the cladding 1 is preferably about 0.029 to 0.032 inches thick.

Contained within the cladding 1 are generally cylindrical fuel pellets 400 having a diameter which is preferably about 0.008 inches smaller than the inside diameter of the cladding 1 in accordance with the present invention.

In a most preferred embodiment of the fuel rod 300 in accordance with the present invention, the fuel pellets 400 have been sintered to about 95% of their theoretical density and have an outside diameter of about 0.39 inches and a height of about 0.47 inches. As shown in FIG. 3 the ends 410 of each enriched pellet have been concavedly dished to minimize relative axial expansion of the hot center portion of the fuel pellet 400 in use. The edges 420 of each pellet 400 have been chamferred. The fuel pellets 400 themselves preferably may include enriched $UO_2$ pellets, enriched $UO_2+Gd_2O_3$ pellets, and natural $UO_2$ pellets. Mixed oxide, $UO_2+PUO_2$, pellets may also be used. The enriched pellets preferably contain uranium which has been enriched to include about 2.8 to 3.2 weight percent $U_{235}$. As shown in FIG. 2, the fuel pellets 400 are preferably stacked into three zones within the cladding tube 1. The bottom zone A is comprised of $UO_2$ pellets containing natural uranium. The bottom pellet in this zone abuts against the bottom Zircaloy end plug 200 which has been previously welded to the cladding tube 1. The middle portion B of the fuel pellet stack preferably makes up about at least 80% of the fuel pellet stack length and contains the aforementioned enriched uranium pellets. Enriched pellets containing about 3 to 5 weight percent gadolinium oxide ($Gd_2O_3$) may be substituted for all or part of the enriched pellets in this zone. The top zone C of the fuel pellet stack is comprised of $UO_2$ pellets containing natural uranium. In a preferred embodiment, the length of zone A and C are equal, and together comprise less than 20% of the fuel pellet stack length. The top pellet in the top zone C is in pressurized abutment with a spring which is compressively held between the top pellet and the top Zircaloy end cap 220 thereby forming a void space or plenum 230. Top end cap 220 is circumferentially welded to the cladding 1. The welded top 220 and bottom 200 end plugs in conjunction with the cladding 1 form a hermetically sealed container around the fuel pellets 400, and spring 210. The void space or plenum 230 is in communication with the clearance spaces 450 left between the pellets and the inside surface of the cladding 9 (see FIG. 3). The clearance spaces 450, 460 and void space 230 have been filled with a high purity, inert atmosphere having high gas thermal conductivity. Preferably, this atmosphere is high purity helium pressurized to about 2 to 5 atmospheres, and most preferably about 3 atmospheres (STP).

While the present invention has been specifically described with respect to PCI crack propagation resistant tin-iron-zirconium base alloys, tin-chromium zirconium base alloys are also contemplated. The present inventors submit that chromium may be directly substituted for iron without detracting from the benefits previously described with respect to the tin-iron-zirconium base alloys in accordance with the present invention, so long as the sum of the iron and chromium contents of the alloy are about 0.03 to 0.11 wt.%.

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

We claim:

1. A nuclear fuel element cladding tube comprising:
   concentric tubular layers of zirconium base alloys;
   said concentric tubular layers including an inner layer and outer layer;
   said outer layer, metallurgically bonded to said inner layer;

said outer layer composed of a first zirconium base alloy characterized by excellent resistance to corrosion caused by exposure to high temperature and pressure aqueous environments;

said inner layer composed of a second zirconium base alloy consisting of:

about 0.2 to 0.6 wt.% tin, about 0.03 to 0.11 wt.% iron, less than about 0.02 wt.% chromium, up to about 350 ppm oxygen and the remainder being zirconium and incidental impurities; and said inner layer characterized by improved resistance to crack propagation under reactor operating conditions compared to said first zirconium alloy.

2. The nuclear fuel element cladding tube according to claim 1 wherein said second zirconium base alloy contains about 0.4 to 0.6 wt.% tin.

3. The nuclear fuel element cladding tube according to claim 1 wherein said inner layer is characterized by a fully recrystallized microstructure.

4. The nuclear fuel element cladding tube according to claim 1 wherein said inner layer has a wall thickness of at least about 0.003 inches.

5. The nuclear fuel element cladding tube according to claim 1 wherein said first alloy is selected from the group consisting of Zircaloy-2, Zircaloy-4 and zirconium 1 to 3 wt.% niobium alloys.

6. The nuclear fuel element cladding tube according to claim 1 wherein the oxygen content of said second zirconium base alloy is limited to less than about 250 ppm.

7. The nuclear fuel element cladding tube according to claim 1 wherein said second zirconium base alloy contains about 0.03 to 0.06 wt.% iron.

8. The nuclear fuel element cladding tube according to claim 4 wherein said inner layer is further characterized by a fully recrystallized grain structure having a grain size between about 1/10 and 1/20 of said inner layer wall thickness.

9. The nuclear fuel element cladding tube in accordance with claim 1 produced by a process comprising the steps of:

obtaining an intermediate size cladding tube;

then surface beta treating said outer layer of said intermediate size cladding tube;

then cold working said intermediate size cladding tube in one step to substantially final size;

and then annealing the substantially final size cladding tube at a temperature below about 600° C. to produce a fine fully recrystallized grain size in said inner layer.

10. A water reactor nuclear fuel element comprising:

an elongate cladding container;

a nuclear fuel material sealed within said cladding container;

said elongate cladding container having:

an outer tubular layer;

an inner tubular layer;

said inner layer concentrically located between said nuclear fuel material and said outer layer; the outer circumferential surface of said inner layer bonded to the inner circumferential surface of said outer layer over essentially the entire outer circumferential surface of said inner layer;

said outer layer composed of a first alloy selected from the group of zirconium alloys consisting of Zircaloy-2 and Zircaly-4 type alloys, and Zr—Nb alloys containing about 1 to 3 wt.% Nb;

said inner layer composed of a second alloy consisting of:

about 0.2 to 0.6 wt.% tin;

about 0.03 to 0.11 wt.% of an element selected from the group consisting of chromium and iron with the sum of the chromium and iron contents being about 0.03 to 0.11 wt.%;

the balance of said second alloy consisting essentially of zirconium and incidental impurities, and wherein the total amount of said incidental impurities is less than about 1500 ppm, of which oxygen comprises less than about 350 ppm;

said inner layer having a recrystallized grain structure and a wall thickness of at least about 0.003 inch;

substantially cylindrically shaped pellets comprising said nuclear fuel material;

said pellets having an outside diameter smaller than the inside diameter of said inner layer forming a clearance space within said elongate composite cladding container;

a pressurized inert gas filling said clearance space.

11. The fuel element according to claim 10 wherein said substantially cylindrically shaped pellets are stacked within said elongate cladding container forming a plenum space near one end of said elongate cladding container and wherein a spring means is located in said plenum exerting pressure on one end of said cylindrically shaped pellets;

and said plenum also containing said pressurized inert gas.

12. The cladding tube according to claim 1 wherein said incidental impurities are limited to the following in weight percent:

| | |
|---|---|
| Al | ≦0.0075 |
| B | ≦0.00005 |
| Cd | ≦0.00005 |
| C | ≦0.027 |
| Cr | ≦0.020 |
| Co | ≦0.0020 |
| Cu | ≦0.0050 |
| Hf | ≦0.0100 |
| H | ≦0.0025 |
| Mg | ≦0.0020 |
| Mn | ≦0.0050 |
| Mo | ≦0.0050 |
| N | ≦0.0065 |
| Si | ≦0.0120 |
| Ti | ≦0.0050 |
| W | ≦0.010 |
| U | ≦0.00035. |

13. The water reactor fuel element according to claim 10 wherein said incidental impurities are limited to the following in weight percent:

| | |
|---|---|
| Al | ≦0.0075 |
| B | ≦0.00005 |
| Cd | ≦0.00005 |
| C | ≦0.027 |
| Co | ≦0.0020 |
| Cu | ≦0.0050 |
| Hf | ≦0.0100 |
| H | ≦0.0025 |
| Mg | ≦0.0020 |
| Mn | ≦0.0050 |
| Mo | ≦0.0050 |
| N | ≦0.0065 |
| Si | ≦0.0120 |
| Ti | ≦0.0050 |
| W | ≦0.010 |

| | |
|---|---|
| -continued | |
| U | ≦0.00035. |

14. The cladding tube according to claim 1 wherein the total amount of said incidental impurities, including oxygen, is limited to less than 1500 ppm.

15. The cladding tube according to claim 1 wherein the first zirconium base alloy is Zircaloy-2.

16. The cladding tube according to claim 1 wherein said first zirconium base alloy is Zircaloy-4.

* * * * *